Dec. 26, 1967     D. A. VOORHIES     3,360,309
SELF-ALIGNING ETERNALLY PRESSURIZED FLUID BEARING
Filed May 11, 1966

INVENTOR.
Donald A. Voorhies
BY
F. J. Hodsle
ATTORNEY

United States Patent Office 3,360,309
Patented Dec. 26, 1967

3,360,309
SELF-ALIGNING ETERNALLY PRESSURIZED
FLUID BEARING
Donald A. Voorhies, West Hartford, Conn., assignor to
General Motors Corporation, Detroit, Mich., a corporation of Delaware
Filed May 11, 1966, Ser. No. 549,419
4 Claims. (Cl. 308—9)

My invention relates generally to fluid bearings and more specifically to externally pressurized self-aligning fluid bearings which are operated at high speeds and under light loads.

An externally pressurized fluid bearing is one in which two relatively movable surfaces are separated by an externally pressurized fluid flowing through a small space between the surfaces. This pressurized flow maintains the surfaces out of contact and supports a load on one of the members equal to the product of the fluid pressure and the effective area upon which it acts. Externally pressurized fluid bearings are a type of a general class of bearings which may be termed fluid film bearings. Fluid film bearings when lightly loaded encounter an instability phenomenon known as half-speed or partial-speed whirl. This instability is encountered usually at about twice the first critical speed of the shaft and is characterized by the shaft orbiting around the center of the journal at approximately half the speed of the rotating shaft. When the instability is encountered, the bearing has no load carrying capacity and suddenly fails. The phenomenon, which is not completely understood, has been explained in the following manner.

Under load, the center of the shaft is eccentric with respect to the center of the journal creating a wedged-shaped annulus. The fluid adjacent the journal is a zero velocity while the fluid adjacent the shaft is at shaft velocity. The velocity of the fluid midway between the shaft and the journal is at half shaft speed so that it is assumed that the fluid flows around the shaft at half shaft speed. This fluid, however, must flow through the wedge created by the eccentricity of the shaft. As long as the fluid can flow through this wedge, the system is happy since the shaft will remain rotating about its mass center. As the shaft speed increases, the fluid flowing into the wedge creates an increasing force which produces a coupling movement on the shaft about the journal center. As long as the shaft is sufficiently loaded to resist this coupling moment and maintain itself rotating about its mass center, the instability does not occur. But in light load applications, the coupling moment overcomes the shaft load moving the shaft center. Another way of viewing this is that the fluid is flowing into the wedge at half shaft speed. The fluid cannot get through the wedge so that it pushes the shaft ahead resulting in an orbiting of the shaft center about the journal center at half shaft speed. This phenomenon I have found can be virtually eliminated by resiliently mounting the journal. A way of explaining how the whirl is eliminated is by reference to the flow wedge concept. When the shaft approaches the speed at which the flow cannot get past the restriction of the wedge, the force acting on the journal which moves it slightly (since it is resiliently mounted) widening the wedge and allowing the flow to pass the restriction, allowing the shaft to keep rotating about its center and thus the bearing can be operated at higher speeds.

Another problem is introduced when a shaft is to be supported at two spaced points. Alignment is critical in externally pressurized bearing applications because of the small clearances which must be maintained between the relatively rotating elements. The alignment can easily be maintained by providing self-alignment for one of the bearings; however, with an externally pressurized bearing, the self-alignment introduces the second problem which is that of supplying the pressurized fluid to a movable journal.

Accordingly, my invention is generally directed to providing an externally pressurized fluid bearing which overcomes one or both of the above problems. In one of its broadest aspects, an object of my invention is to provide a simplified structure for incorporating a resilient mount and a self-aligning feature into a fluid flow bearing. In another of its broadest aspects, an object of my invention is to provide an externally pressurized fluid bearing which is self-aligning and adapted to be fed pressurized fluid in a simple and unique manner. While either aspect results in an improvement, the best improvement results from incorporation of both aspects of my invention. In other words, an externally pressurized fluid bearing which is self-aligning, which inhibits half-speed whirl and in which the bearing space is easily accessible to an externally pressurized fluid source results in the best improvement.

Another object of my invention is to provide such a bearing which is universally mounted for self-alignment, resiliently mounted to inhibit half-speed whirl, and has a unique and simple provision for supplying pressurized fluid to the bearing.

Other objects and advantages of the inventon will hereinafter become more fully apparent from the following description of the annexed drawings, which illustrate a preferred embodiment, and wherein.

Figure 1:
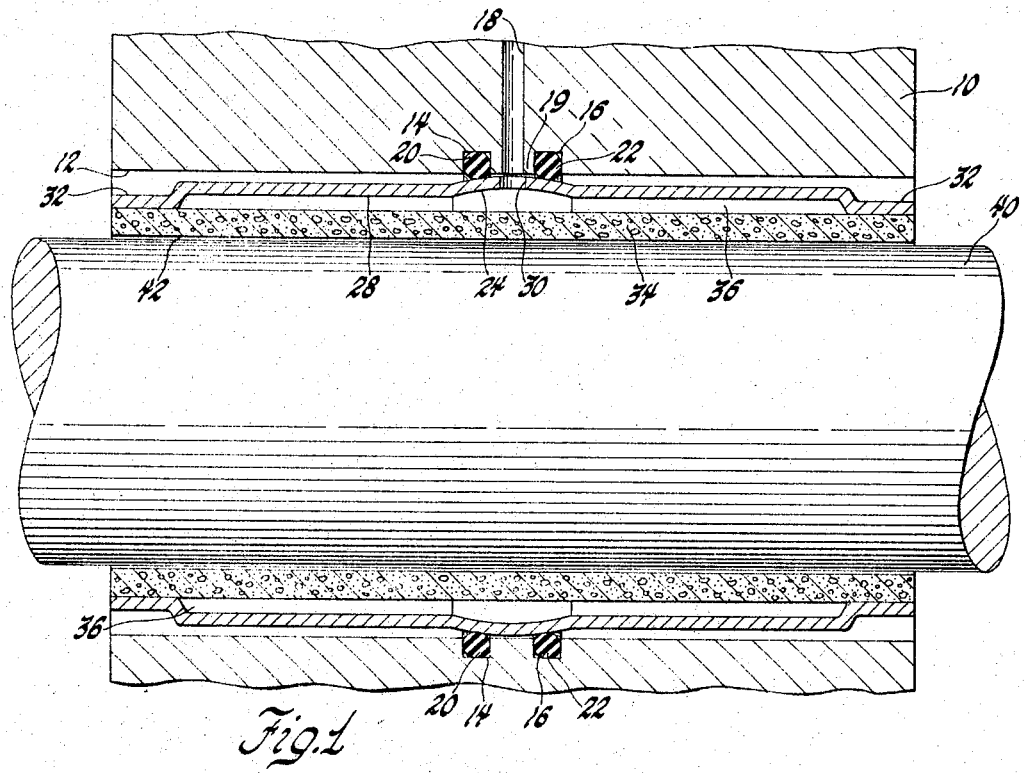
FIGURE 1 is a longitudinal section view showing an externally pressurized fluid bearing in accordance with my invention.
Figure 2:
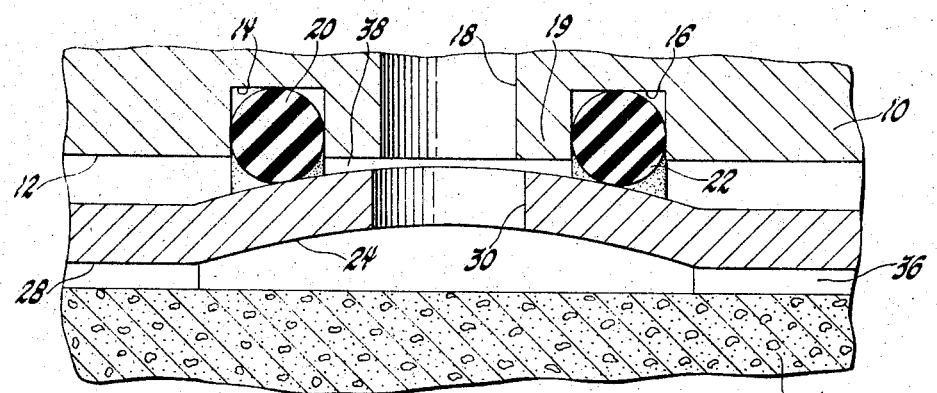
FIGURE 2 is an enlarged view of a portion of FIGURE 1.

Referring now to the drawings, I have shown an externally pressurized bearing comprising a housing 10 having a longitudinal bore 12. In the center of the bore are two spaced annular grooves 14 and 16 which open into the bore 12. A passage 18 in the housing 10 opens into an annular land 19 in the bore 12 between the grooves 14 and 16. Resilient O-rings 20 and 22 are disposed in the grooves 14 and 16, respectively. The major portion of the O-rings 20 and 22 are within the grooves; however, the radially inner portions protrude into the bore 12 to seat against the shoulders defined by a circumferential bulge 24 disposed adjacent the center of an annular shell 28. The ends 32 of the shell 28 have integral inturned flanges and end portions of reduced diameter which sealingly engage a porous sleeve 34 so that it is mounted within the shell 28 but radially spaced from its main body portion to form a chamber 36. An aperture 30 in the bulged shell portion 24 fluidly connects the chamber 36 with a circumferential space 38 which lies between the shell 28 and the housing 10 and is sealed from the remainder of bore 12 by the O-rings 20 and 22. Passage 18 opens into space 38. A shaft 40 is disposed within the porous sleeve 34 within a small clearance 42 between them.

In operation, pressurized fluid, for example, air, is fed from a pump (not shown) to the passage 18. The pressurized air flows into the space 38, through aperture 30 and into the chamber 36. The pressurized air flows radially through the porous sleeve 34 and into the space 42 between the sleeve 34 and the shaft 40 and out the open ends of the space 42. The pressurized air flow antifrictionally supports the shaft. The resilient mounting of the sleeve 34 by resilient O-rings 20 and 22 inhibits half-speed whirl as explained in the introduction. The O-rings perform two other useful functions; that is, they cooperate with the partispherical shell portion 24 to universally mount the shell 28 and sleeve 34 for self-alignment and also seal the space 38 from the bore 12 so that it forms a part of the pressurized air feed system. While the rubber O-rings 20 and 22 are in sealing frictional engagement with the shell 28, the friction is not so great as to prevent relative movement for self-alignment.

Thus it can be seen that I have provided a bearing which is universally mounted for self-alignment, resiliently mounted to inhibit half-speed whirl, and has a unique and simple provision for supplying pressurized fluid to the bearing.

It should be understood, of course, that the foregoing disclosure relates to only a preferred embodiment of the invention and that numerous modifications or alterations may be made therein without departing from the spirit and scope of the invention as set forth in the appended claims.

I claim:

1. An externally pressurized gas bearing comprising, in combination, a housing having a bore, a pair of axially spaced resilient O-rings mounted in said bore, an annular shell disposed in said bore having a central partispherical portion seated in said O-rings, a porous sleeve disposed in and spaced from said shell, inturned flanges on said shell in sealing engagement with said sleeve to form a chamber therebetween, and inlet means for said chamber whereby said porous sleeve is universally and resiliently mounted to provide self-alignment and inhibit half-speed whirl.

2. The gas bearing as defined in claim 1 wherein said housing is provided with an inlet passage transverse to and opening into said bore between said O-rings and wherein a passage is provided in said shell in said partispherical portion seated in said O-rings whereby said chamber is adapted to receive a pressurized gas from an external source.

3. The gas bearing as defined in claim 1 wherein said housing has a pair of axially spaced annular grooves opening into said bore and wherein said O-rings are disposed in said grooves, respectively, and protrude into said bore.

4. The gas bearing as defined in claim 3 wherein said housing is provided with an inlet passage transverse to and opening into said bore between said O-rings and wherein a passage is provided in said shell in said partispherical portion seated in said O-rings whereby said chamber is adapted to receive a pressurized gas from an external source.

References Cited

FOREIGN PATENTS 796,926    6/1958    Great Britain.

MARTIN P. SCHWADRON, *Primary Examiner.*

FRANK SUSKO, *Examiner.*